(12) United States Patent
Horibe et al.

(10) Patent No.: US 8,145,857 B2
(45) Date of Patent: Mar. 27, 2012

(54) CONTROL OF ACCESS TO AN EXTERNAL STORAGE DEVICE

(75) Inventors: Masahiko Horibe, Nagoya (JP); Taichi Ejiri, Nagoya (JP); Tsukasa Ito, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 392 days.

(21) Appl. No.: 12/465,510

(22) Filed: May 13, 2009

(65) Prior Publication Data

US 2009/0287897 A1 Nov. 19, 2009

(30) Foreign Application Priority Data

May 14, 2008 (JP) ................................. 2008-126886

(51) Int. Cl.
*G06F 12/00* (2006.01)
(52) U.S. Cl. ........ 711/156; 711/167; 711/112; 711/113; 711/154
(58) Field of Classification Search .................. 711/167, 711/112, 113, 154
See application file for complete search history.

(56) References Cited

U.S. PATENT DOCUMENTS

2007/0113005 A1* 5/2007 Yamamoto et al. ........... 711/112

FOREIGN PATENT DOCUMENTS

JP 11-194938 7/1999

* cited by examiner

*Primary Examiner* — Thong Q Le
(74) *Attorney, Agent, or Firm* — Beyer Law Group LLP

(57) ABSTRACT

The control device has a fetching unit, a virtual drive creation unit, and an access control unit. The fetching unit fetches, from the external storage device, attribute information relating to data stored in the external storage device. The virtual drive creation unit creates, in the control device, a virtual drive for storing the fetched attribute information. The access control unit controls access to the virtual drive and the external storage device. When an instruction relating to the attribute information is input, the access control unit accesses the virtual drive to fetch the attribute information. When an instruction to read the data from the external storage device is input, the access control unit accesses the external storage device to reads the data. When an instruction to write new data to the external storage device is input, the access control unit accesses the external storage device to write the new data.

16 Claims, 7 Drawing Sheets

CONTROL OF ACCESS TO AN EXTERNAL STORAGE DEVICE

BACKGROUND

1. Technical Field

The present invention relates to technology for controlling access to an external storage device.

2. Related Art

So-called externally attached external storage devices such as hard disk drives which are connected to a personal computer, for which the turning on and off of the power is linked with turning on and off of the power supply of the personal computer (hereafter called simply "external storage devices") have become widespread. With this kind of external storage device, it is not necessary for the user to turn the power on and off when using the external storage device, so the convenience level is high. Also, when the personal computer power is off, the power of the external storage device is automatically turned off, so it is possible to suppress power consumption of the external storage device (consumption of standby power).

Also, even when the personal computer is in an on state, by stopping the operation of the external storage device when there is no access from the personal computer to the aforementioned external storage device for a specified time, it is further possible to save power with the external storage device. This function is possible by installing so-called utility software for realizing the function described above in a personal computer, for example.

However, with the technology described above, when stopping the operation of the external storage device, it becomes impossible to recognize the external storage device on the personal computer side, and there were times when it was not possible to use data stored in the external storage device. In this case, to have the external storage device recognized again by the personal computer, it was necessary for the user to do the work of, for example, restarting the personal computer, reconnecting the connection cable that connects the personal computer and the external storage device, activating the utility software for recognizing the external storage device again, restoring the communication between the personal computer and the external storage device, and restoring the operation of the external storage device.

The present invention was created to address the problems described above, and an advantage of some aspects of the invention is to improve the usability in saving power with the external storage device.

The entire disclosure of Japanese patent application No. 2008-126886 of BUFFALO is hereby incorporated by reference into this document.

SUMMARY

The present invention can be realized as the following aspects or application examples in order to address at least part of the problems described above.

A control device for controlling access to an external storage device comprising:

a fetching unit that fetches, from the external storage device, attribute information relating to data stored in the external storage device, a virtual drive creation unit that creates, in the control device, a virtual drive for storing the fetched attribute information, and an access control unit that controls access to the virtual drive and the external storage device, wherein when an instruction relating to the attribute information is input, the access control unit accesses the virtual drive to fetch the attribute information;

when an instruction to read the data from the external storage device is input, the access control unit accesses the external storage device to reads the data; and when an instruction to write new data to the external storage device is input, the access control unit accesses the external storage device to write the new data.

As the aforementioned virtual drive, it is possible to use a RAM disk, for example. Also, as the aforementioned attribute information, examples include folder information (e.g. name, size, creation date and time), file information (e.g. name, size, thumbnail, creation date, upgrade date and time), for example.

With the control device of aspect 1, the aforementioned attribute information is stored in the virtual drive. Accordingly, it is possible for the user, using the control device, to get the attribute information relating to data stored in the external storage device, even after, for example, communication between the control device (e.g. a personal computer) and the external storage device is stopped, or the external storage device is not operating, in order to save power with the external storage device. Furthermore, with the control device of aspect 1, regardless of the operating status of the external storage device, and without being aware of the operating state of the external storage device, the user is able to get the attribute information stored in the virtual drive and read it. Therefore, it is possible to improve the usability when, for example, power with the external storage device is saved.

These and other objects, features, aspects, and advantages of the present invention will become more apparent from the following detailed description of the preferred embodiments with the accompanying drawings.

DESCRIPTION OF EXEMPLARY EMBODIMENT

The present invention will be described below on the basis of certain preferred embodiments.

A. FIRST EMBODIMENT

A1. System Configuration

Figure 1:
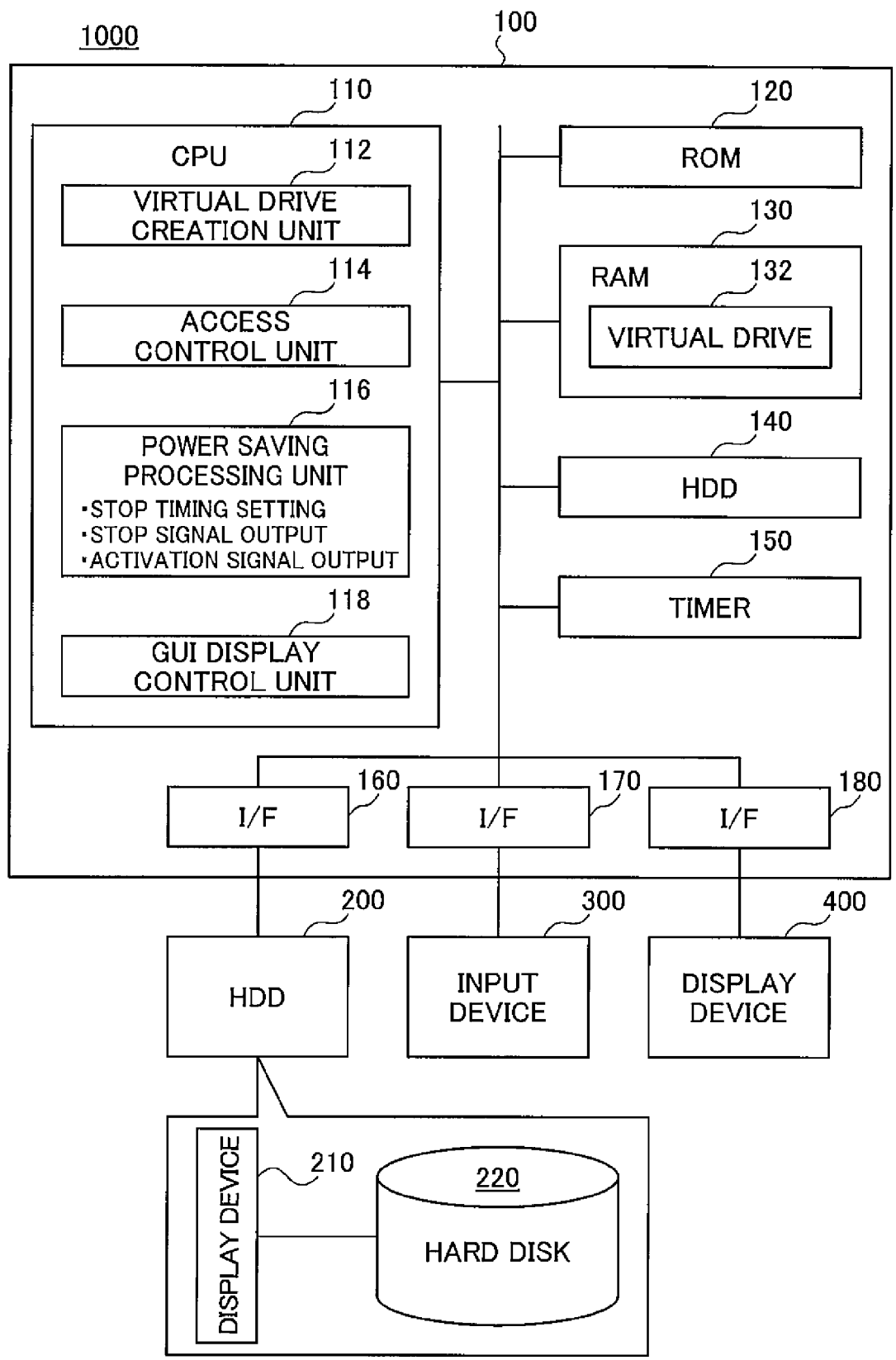
FIG. 1 is an explanatory drawing showing the schematic structure of a computer system 1000 as a first embodiment of the invention.

FIG. 1 is an explanatory drawing showing the schematic structure of a computer system 1000 as a first embodiment of the invention. This computer system 1000 is equipped with a personal computer 100, an external hard disk drive (HDD) 200, an input device 300 such as a mouse, keyboard, and a display device 400.

The personal computer 100 is equipped with a CPU 110, a ROM 120, a RAM 130, a built in hard disk drive (HDD) 140, a timer 150, and an interface (I/F) 160, 170, and 180. Also, the personal computer 100 is equipped with a power supply unit (not illustrated) for supplying power (bus power) to the external hard disk drive 200. The external hard disk drive 200 is connected to the interface 160 via USB cable capable of supplying power and exchanging various types of signals and data. Instead of the USB cable, it is also possible to use an IEEE 1394 cable, an eSATA cable, for example. Also, an input device 300 is connected to the interface 170. Also, a display device 400 is connected to the interface 180.

The external hard disk drive 200 is equipped with a control unit 210 and a hard disk 220. The control unit 210, though these are not illustrated, is equipped with (i) an interface for performing exchange of various types of signals and data with the personal computer 200 and supply of bus power from the personal computer 100, (ii) a motor equipped in the external hard disk drive 200, (iii) a drive control unit that performs drive control of the head, and (iv) a read/write control unit that controls reading of data from the hard disk 220 and writing of data to the hard disk 220. The external hard disk drive 200 has the function of automatically activating, when the personal computer 100 is activated, by detecting the bus power supplied from the personal computer 100 and the SOF (Start Of Frame) packet with the control unit 210. Also, as described later, the external hard disk drive 200 has the function of stopping operation to save power, when the stop signal from the personal computer 100 is received by the control unit 210. Note that with this embodiment, the drive letter "E:" will be allocated to the external hard disk drive 200.

Stored in the built in hard disk drive 140 are the operating system, various types of application software such as various utility software, document creation software, spreadsheet software, video playback software, image editing software, and various types of data files. Note that with this embodiment, the drive letter "C:" is allocated to the built in hard disk drive 140.

The CPU 110 is equipped with a virtual drive creation unit 112, an access control unit 114, a power saving processing unit 116, and a GUI (graphical user interface) display control unit 118. Each of these units is constituted by reading and executing specified utility software stored in the built in hard disk drive 140 under the operating system.

The virtual drive creation unit 112 creates the virtual drive 132 within the RAM 130, fetches the attribute information related to data (folders and data files) stored in the hard disk 220, and stores it in the virtual drive 132. As attribute information, examples include folder information (e.g. name, size, contents, creation date and time), file information (e.g. name, size, thumbnail, creation date and time, update date and time).

The access control unit 114 controls access to the virtual drive 132 and the external hard disk drive 200.

The power saving processing unit 116, to save power of the external hard disk drive 200, performs, for example, (i) setting of the stop timing that stops operation of the external hard disk drive 200, (ii) output of the stop signal for stopping the operation of the external hard disk drive 200, (iii) output of the activation signal for activating the external hard disk drive 200.

The GUI display control unit 118 displays various graphical user interfaces on the display device 400 according to the operation of the input device 300 by the user.

Note that the operation control of the computer system 1000 by each of these units will be described later.

A2. Stop Timing Setting Process

With the computer system 1000 of this embodiment, when there is no data exchange between the personal computer 100 and the external hard disk drive 200 for a specified period, a stop signal is output to the external hard disk drive 200 from the personal computer 100 in order to stop the operation of the external hard disk drive 200, and power is saved with the external hard disk drive 200.

Figure 2:
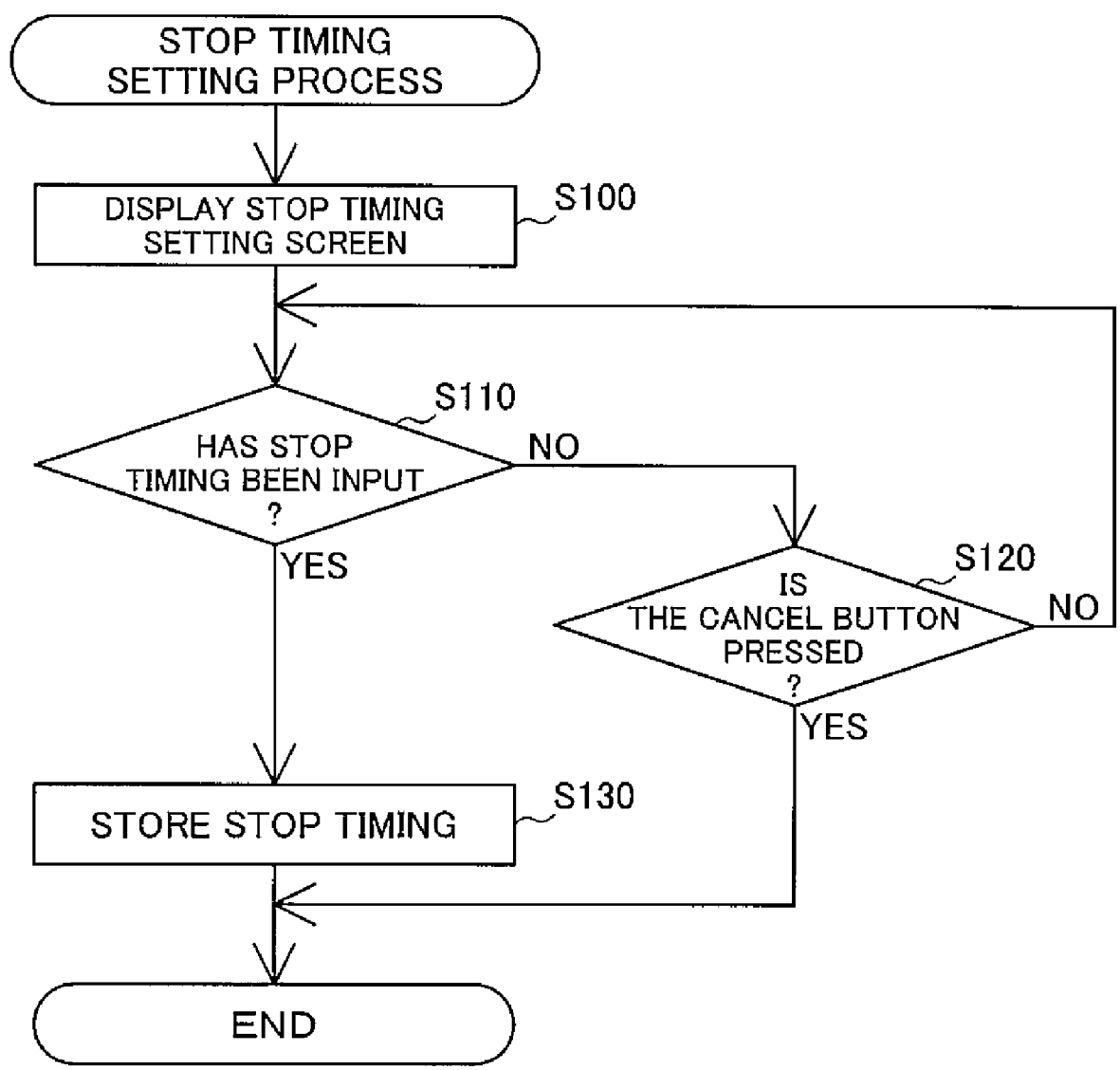
FIG. 2 is a flow chart showing the flow of the stop timing setting process of the external hard disk drive 200.

FIG. 2 is a flow chart showing the flow of the stop timing setting process of the external hard disk drive 200. This stop timing setting process is a process that sets the period from the timing when the data exchange between the personal computer 100 and the external hard disk drive 200 is over to the timing when the personal computer 100 outputs a stop signal.

First, when the display instruction of the stop timing setting screen are input from the input device 300 by operation of the input device 300 by the user, the GUI display control unit 118 in the CPU 110 displays the stop timing setting screen on the display device 400 (step S100).

Figure 3:
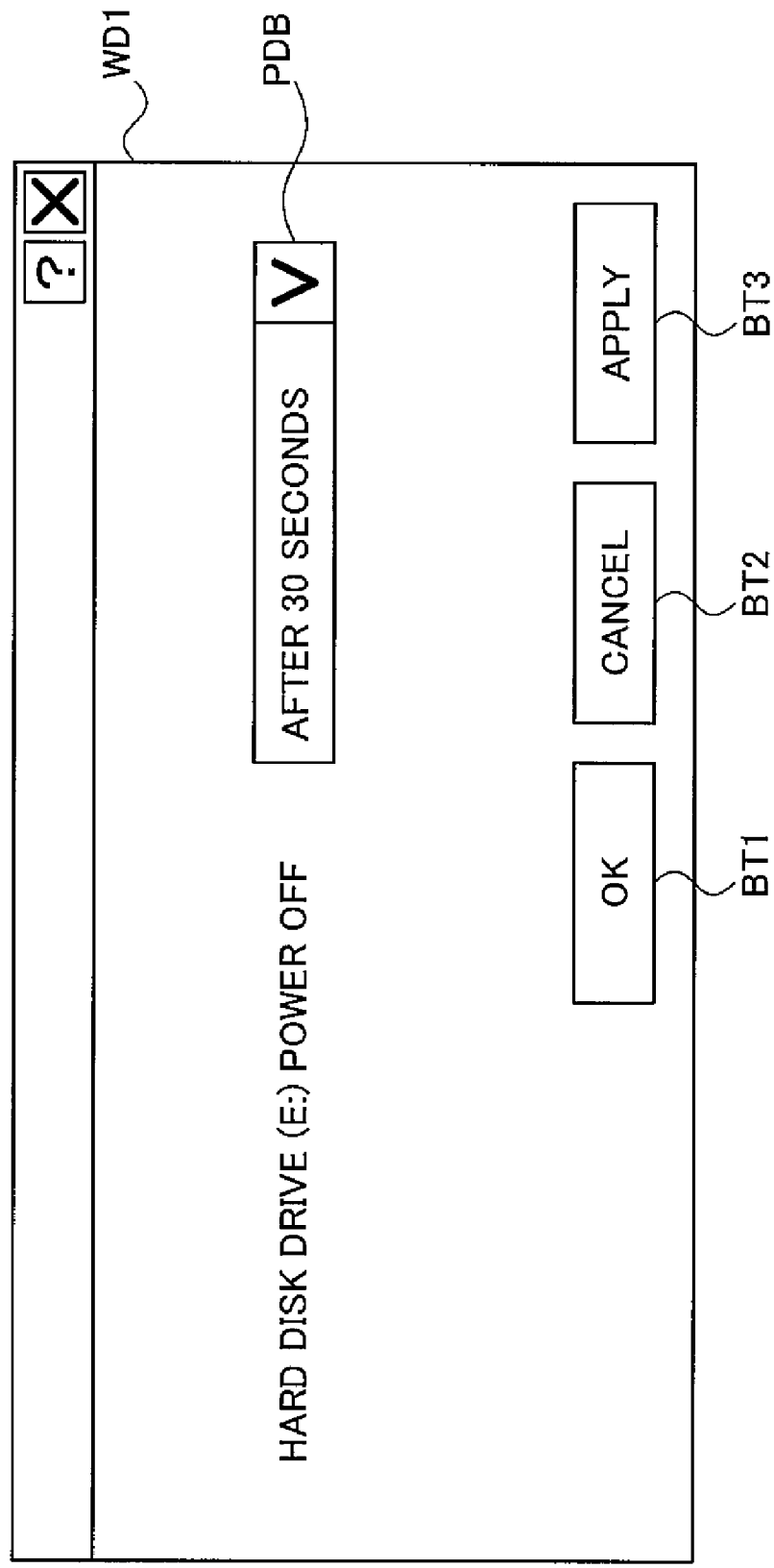
FIG. 3 is an explanatory drawing showing an example of the stop timing setting screen WD1.

FIG. 3 is an explanatory drawing showing an example of the stop timing setting screen WD1 displayed on the display device 400 at step S100. As shown in the drawing, in this stop timing setting screen WD1, (i) a pull down box PDB for the user to select the time until the power of the external hard disk drive 200 is turned off, specifically, the time until the personal computer 100 outputs the stop signal, (ii) an OK button BT1, (iii) a Cancel button BT2, and (iv) an Apply button BT3 are displayed. Then, by the user operating the mouse on the stop timing setting screen WD1, the time until the power of the external hard disk drive 200 is turned off is set. Note that instead of the pull down box PDB, it is also possible to display a text box, for example.

Going back to FIG. 2, the stop timing setting process will be described. Next, the CPU 110 determines whether or not the stop timing has been input, specifically, (i) at the stop timing setting screen WD1 shown in FIG. 3, the time until the power of the external hard disk drive 200 is turned off is selected by the user, and (ii) the Apply button BT3 or the OK button BT1 has been pressed (step S110). When the stop timing has not been input (step S110: No), the CPU 110 determines whether or not the Cancel button BT2 has been pressed in the stop timing setting screen WD1 shown in FIG. 3 (step S120). In case where the Cancel button BT2 has been pressed (step S120: Yes), the stop timing is set as the default value, and the stop timing setting process ends. In case where the Cancel button BT2 has not been pressed (step S120: No), the process returns to step S110.

At step S110, when the stop timing is input (step S110: Yes), the CPU 110 stores that stop timing (step S130), and the stop timing setting process ends.

A3. Operation Control

Figure 4:
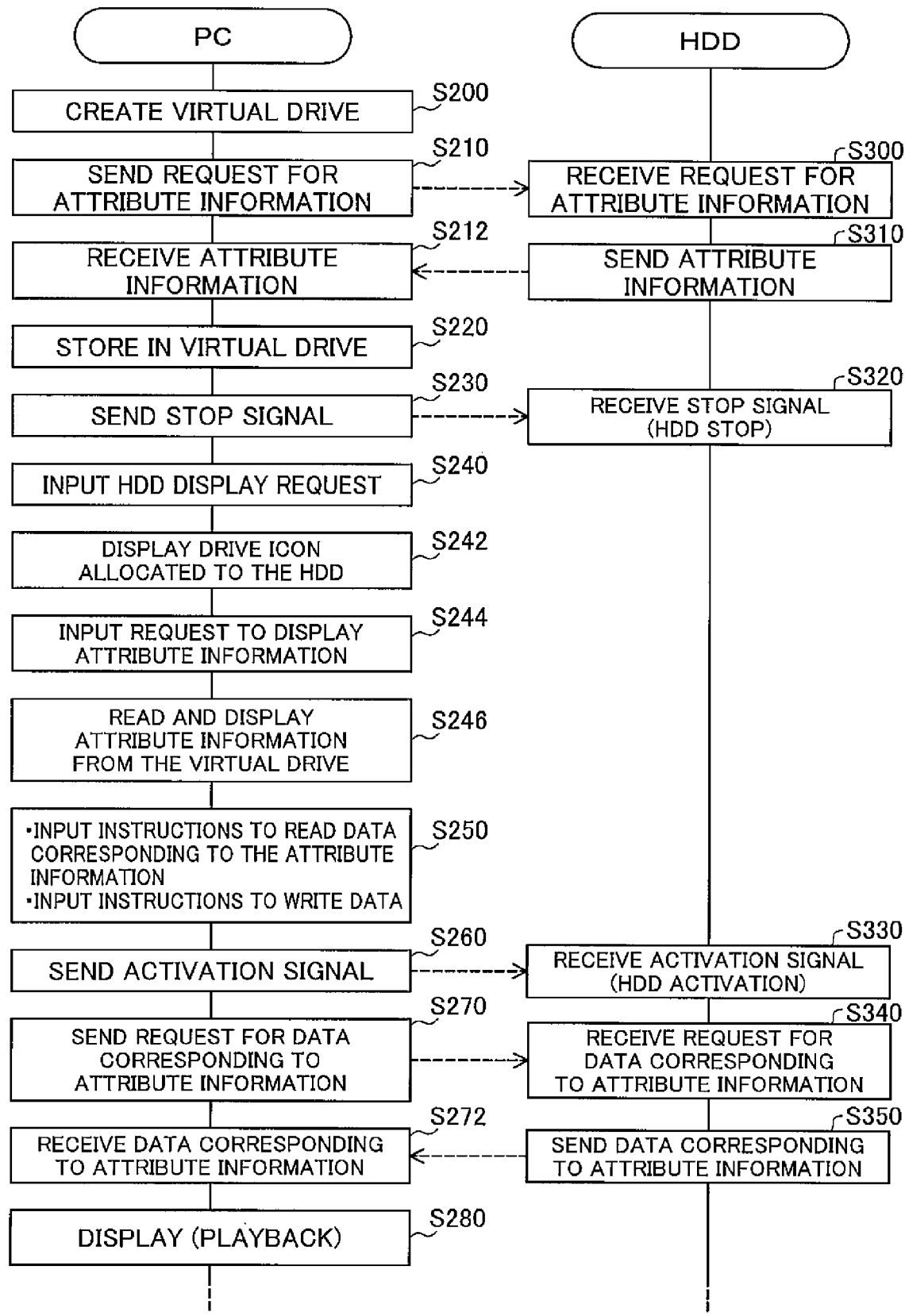
FIG. 4 is a flow chart showing an example of the flow of operation control of the computer system 1000.

FIG. 4 is a flow chart showing an example of the flow of operation control of the computer system 1000. This operation control is executed after the personal computer 100 is activated and the external hard disk drive 200 is activated in cooperation with the personal computer 100's activation. At the left side of this drawing is shown the flow of the process executed by the personal computer (PC) 100. Also, at the right side of the drawing is shown the flow of the process executed by the external hard disk drive (HDD).

First, the virtual drive creation unit 112 in the CPU 110 of the personal computer 100 create the virtual drive 132 (RAM disk) in the RAM 130 (step S200), and send a request for attribute information relating to data stored in the hard disk 220 to the external hard disk drive 200 (step S210).

When the control unit 210 of the external hard disk drive 200 receives the request for attribute information from the personal computer 100 (step S300), the control unit 210 reads attribute information relating to all the stored data from the hard disk 220 and send to the personal computer 100 (step S310).

When the CPU 110 of the personal computer 100 receives the attribute information from the external hard disk drive 200 (step S212), the CPU 110 stores the received attribute information in the virtual drive 132 (step S220).

After that, the CPU 110 references a timer 150, and in a state without data exchange between the personal computer 100 and the external hard disk drive 200, when the time set by the stop timing setting process described previously has passed, the stop signal is sent by the power saving processing unit 116 to the external hard disk drive 200 (step S230).

When the control unit 210 of the external hard disk drive 200 receives the stop signal from the personal computer 100 (step S320), the control unit 210 stops the operation of the external hard disk drive 200. With this aspect, it is possible to save power with the external hard disk drive 200. Note that after the operation of the external hard disk drive 200 stops, communication between the personal computer 100 and the external hard disk drive 200 temporarily stops, and the external hard disk drive 200 is no longer recognized by the personal computer 100.

When instructions that the drive icon of the external hard disk drive 200 is to be displayed on the display device 400 (e.g. display instructions of "My Computer" with Windows (trademark)) are input by operation of the input device 300 by the user (step S240), the GUI display control unit 118 in the CPU 110 of the personal computer 100 displays the drive icon (drive letter "E:") allocated to the external hard disk drive 200 on the display device 400 (step S242). In the step S242, the drive icon (drive letter "E:") is displayed on the display device 400, regardless of the operating status of the external hard disk drive 200, specifically, regardless of whether or not the external hard disk drive 200 is recognized by the personal computer 100 or not.

Figure 5:
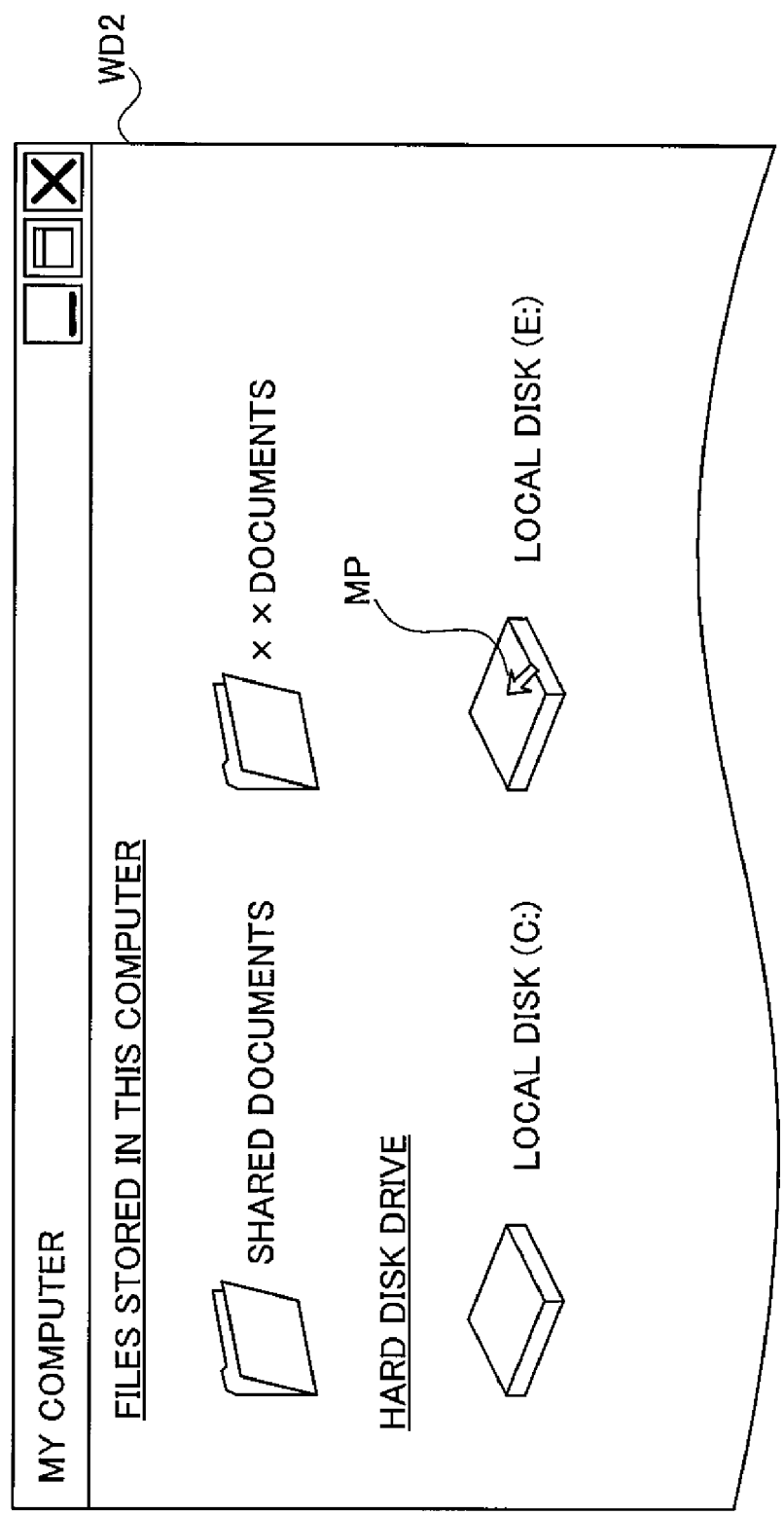
FIG. 5 is an explanatory drawing showing an example of the drive display screen WD2.

FIG. 5 is an explanatory drawing showing an example of the drive display screen WD2 displayed on the display device 400. As shown in the drawing, a folder icon of "Files Stored in This Computer" and drive icons of the "Hard Disk Drive" are displayed in this drive display screen WD2. The "Local Disk (C:)" in the drawing shows a drive icon of the built in hard disk drive 140, and the "Local Disk (E:)" shows the drive icon of the external hard disk drive 200 or the virtual drive 132.

Returning to FIG. 4, the operation control of the computer system 1000 will be described. On the drive display screen WD2 in FIG. 5, when the attribute information display instructions are input (step S244), e.g. when the user places the mouse pointer MP over the drive icon of the "Local Disk (E:)" by operating the mouse, and for example the mouse is double clicked, the access control unit 114 in the CPU 110 reads the attribute information from the virtual drive 132, and the GUI display control unit 118 in the CPU 110 displays the attribute information display screen described later on the display device 400 (step S246).

Figures 6, 7:
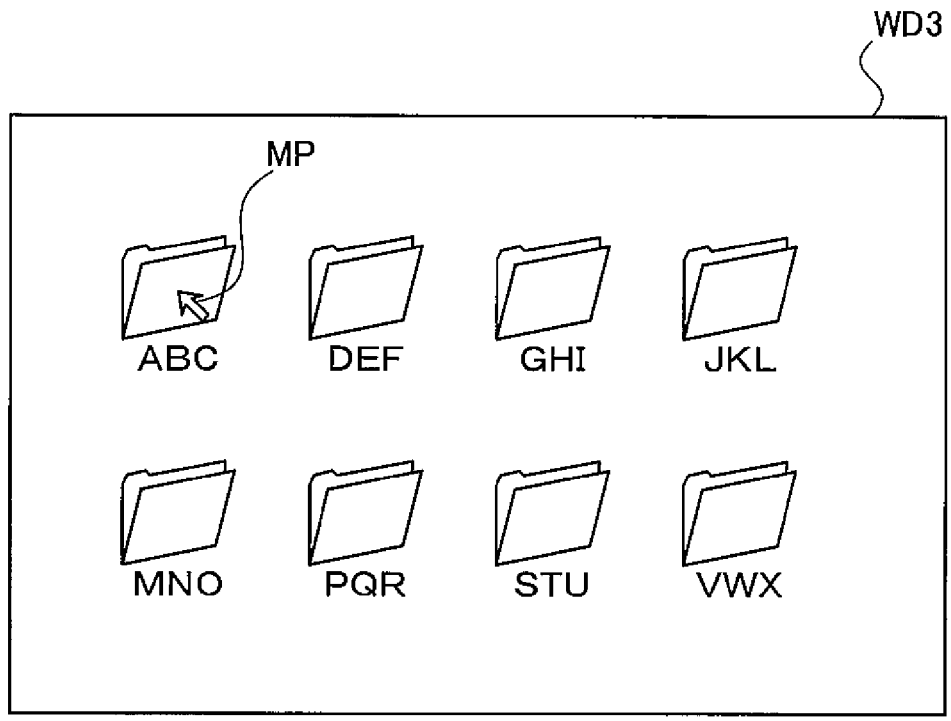
FIG. 6 is an explanatory drawing showing an example of the attribute information display screen WD3.
FIG. 7 is an explanatory drawing showing an example of the attribute information display screen WD4.

FIGS. 6 and 7 are explanatory drawings showing examples of the attribute information display screens WD3 and WD4 displayed in the display device 400. With the example shown in FIG. 6, the folder icon and name are displayed in this attribute information display screen WD3. It is also possible to display more detailed attribute information relating to the folder in the attribute information display screen WD3. Then, in case where by operating the mouse, the user places the mouse pointer MP over the icon of the desired folder, and for example he double clicks the mouse, i.e. the instructions to display the attribute information of the files within the folder are input, the file information (attribute information) relating to the files stored in the folder is displayed.

FIG. 7 is an explanatory drawing showing an example of the attribute information display screen WD4. With the example in the drawing, displayed in the attribute information display screen WD4 are the file name, size, type, and the update date and time.

Returning to FIG. 4, the operation control of the computer system 1000 will be described. In case where (i) by operating the mouse, the user places the mouse pointer MP over the name of the desired file, for example, on the attribute information display screen WD4, and double clicks the mouse, i.e. instructions to read that file data, specifically to read data corresponding to the attribute information are input, or (ii) instructions to write new data to the external hard disk drive 200 are input (step S250), the power saving processing unit 116 in the CPU 110 sends the activation signal to the external hard disk drive 200 (step S260).

When the control unit 210 of the external hard disk drive 200 receives the activation signal from the personal computer 100 (step S330), the control unit 210 activates the external hard disk drive 200. With this aspect, it is possible to reactivate the external hard disk drive 200 for which operation has stopped without the user being conscious of. Accordingly, it is possible to improve usability when reactivating the external hard disk drive 200.

Then, the access control unit 114 in the CPU 110 of the personal computer 100 send the request for data corresponding to the attribute information input at step S250 to the external hard disk drive 200 (step S270). Note that at step S250, when instructions to write new data to the external hard disk drive 200 are input, the CPU 110 sends that data to the external hard disk drive 200. In this case, the CPU 110 adds to the virtual drive 132 the attribute information relating to data for which write instructions were input, and updates the contents of the virtual drive 132. With this aspect, it is possible to maintain the precision and up-to-date status of the attribute information stored in the virtual drive 132.

When the control unit 210 of the external hard disk drive 200 receives the request for data corresponding to the attribute information from the personal computer 100 (step S340), the control unit 210 reads the data corresponding to that attribute information from the hard disk 220, and sends to the personal computer 100 (step S350). Note that when a request to write data to the external hard disk drive 200 is sent from the personal computer 100 at step S270, the control unit 210 writes data (including the attribute information) to the hard disk 220 according to this write request.

When the CPU 110 of the personal computer 100 receives the data corresponding to the attribute information from the external hard disk drive 200 (step S272), an application associated with that data type is activated, and data display (playback) is performed (step S280).

Note that in the example described above, for convenience of description, one case is described in which, after step S220, a time set by the stop timing setting process described previously has passed in a state without data exchange between the personal computer 100 and the external hard disk drive 200. However, the flow of the control described above can be suitably modified in a case where, (i) display instructions to display the external hard disk drive 200 on the display device 400 are input, (ii) instructions to read data corresponding to the attribute information or (iii) instructions to write data to the external hard disk drive 200 are input before that time has passed.

In the computer system 1000 of the first embodiment described above, attribute information relating to data stored in the hard disk 220 of the hard disk drive 200 is stored in the virtual drive 132 (step S220). Accordingly, the user is able to display and read on the display device 400 attribute information relating to data stored in the external hard disk drive 200 (step S246), even after, the communication between the personal computer 100 and the external hard disk drive 200 is stopped and the external hard disk drive 200 is not operating in order to save power with the external hard disk drive 200. Furthermore, with the computer system 1000 of this embodiment, regardless of the operating state of the external hard disk drive 200, and without being conscious of the operating state of the external hard disk drive 200, the user is able to display and read on the display device 400 the attribute information stored in the virtual drive 132. Therefore, it is possible to improve usability when trying to save power with the external hard disk drive 200.

In the first embodiment, the control device is realized in a combination of the personal computer 100, the input device 300 and the display device 400. However, the control device can be realized in various forms. For example, the computer 100 can be realized in a combination of a plurality of elements which can communicate each other via a network. In such an embodiment, the virtual drive 132 may be created in an element A with a memory and the element A may be connected with another element B containing a CPU 110, a ROM 120, a RAM 130 etc.

B. SECOND EMBODIMENT

Figure 8:
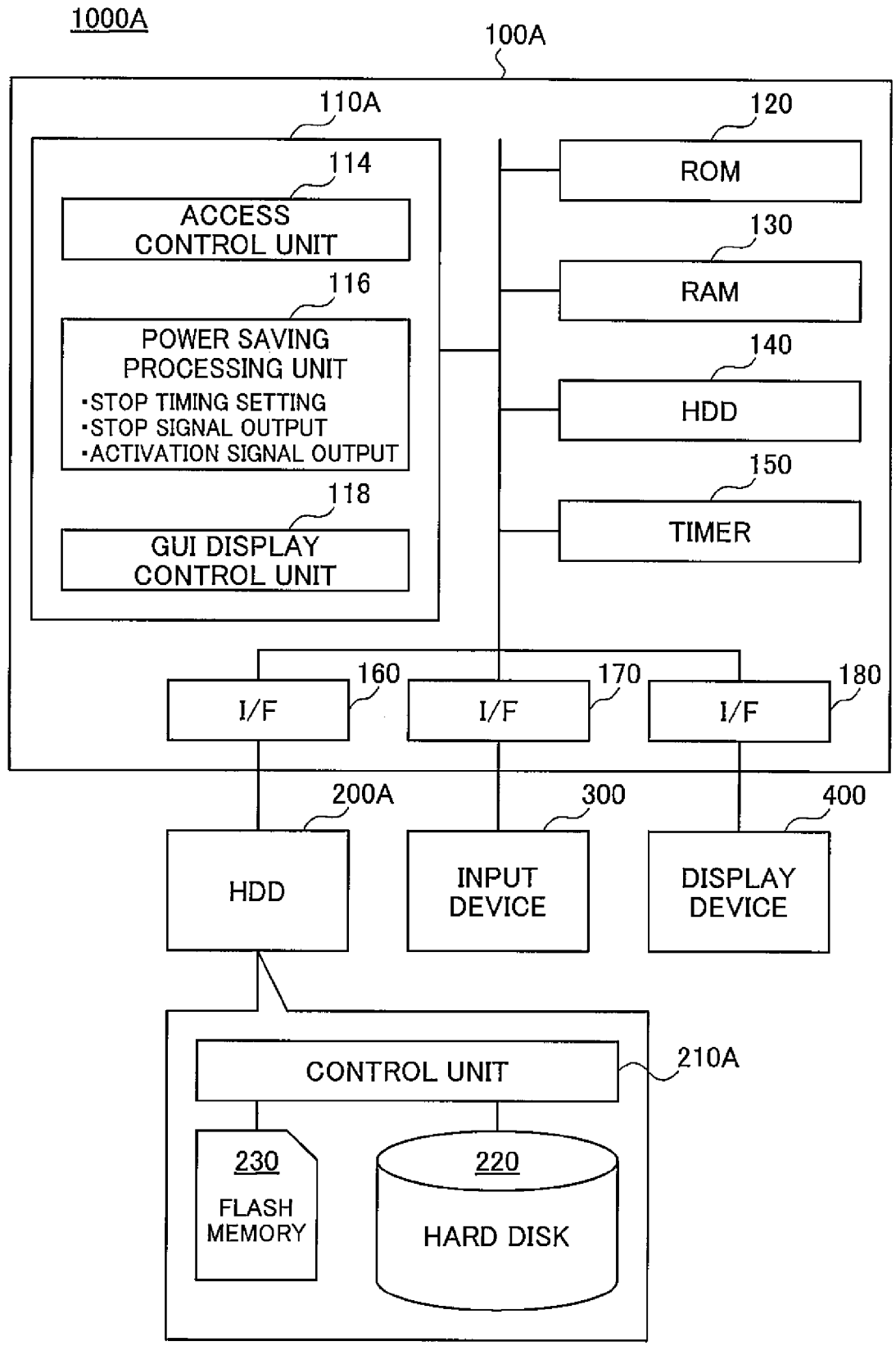
FIG. 8 is an explanatory drawing showing the schematic structure of the computer system 1000A as the second embodiment of this invention.

FIG. 8 is an explanatory drawing showing the schematic structure of the computer system 1000A as the second embodiment of this invention. The same as with the computer system 1000 of the first embodiment, this computer system 1000A is equipped with a personal computer 100A, an external hard disk drive (HDD) 200A, an input device 300 such as a mouse, keyboard, and a display device 400. However, with the computer system 1000A of this embodiment, as shown in the drawing, the CPU 110A of the personal computer 100A is not equipped with the virtual drive creation unit 112 of the first embodiment. Instead of that, the external hard disk drive 200A is equipped with a flash memory 230, and in that flash memory 230 is stored attribute information related to data stored in the hard disk 220. In another embodiment, it is also possible to use another recording medium instead of the flash memory 230. Writing of attribute information to the flash memory 230 and reading of attribute information from the flash memory 230 are performed by the control unit 210A in the external HDD 200A.

Note that with the computer system 1000A of this embodiment, the stop timing setting process at the personal computer 100A is almost the same as with the first embodiment. Also, the operation control with the computer system 1000A of this embodiment is also almost the same as the operation control of the computer system 1000 of the first embodiment except for using the flash memory 230 instead of the virtual drive 132 of the first embodiment.

With the operation control of the computer system 1000A of the second embodiment, when the control unit 210A of the external hard disk drive 200A receives the stop signal from the personal computer 100A, the operation of the drive unit of the hard disk 220 is stopped in order to save power. However, in contrast to the operation control with the computer system 1000 of the first embodiment, the communication between the personal computer 100A and the external hard disk drive 200A is not stopped in the second embodiment. Accordingly, the personal computer 100A is able to fetch attribute information from the flash memory 230 of the external hard disk drive 200A.

With the computer system 1000A of the second embodiment described above as well, the same as with the computer system 1000 of the first embodiment described previously, the user is able to display and read on the display device 400 the attribute information stored in the flash memory 230, regardless of the operating state of the external hard disk drive 200A, and without being conscious of the operating status of the external hard disk drive 200A. As a result, with the computer system 1000A of the second embodiment, it is possible to improve usability when saving power with the external hard disk drive 200A.

C. VARIATION EXAMPLES

Above, we described a number of aspects of this invention, but this invention is not limited at all by these aspects, and it is possible to implement this in various modes within a scope that does not stray from the key points.

C1. Variation Example 1

With the first embodiment noted above, the CPU 110 of the personal computer 100 performed the stop timing setting process, but it is also possible to omit this. However, by performing the stop timing setting process, the personal computer 100 outputs the stop signal with the timing set by the user, so it is possible to improve convenience.

C2. Variation Example 2

With the first embodiment noted above, the CPU 110 of the personal computer 100 created the virtual drive 132 when the personal computer 100 was activated, and stored attribute information, but this invention is not limited to this aspect. For example, it is also possible to perform these processes when the load of the CPU 110 is relatively low.

C3. Variation Example 3

With the embodiment noted above, as the external storage device with the invention, the external hard disk drive 200 and 200A were used, but the invention is not limited to this. It is also possible to use a built in hard disk drive 140, an external MO drive, a CD drive, a DVD drive, for example, instead of the external hard disk drive 200.

C4. Variation Example 4

The Program product may be realized as many aspects. For example:
(i) Computer readable medium, for example the flexible disks, the optical disk, or the semiconductor memories;
(ii) Computer including the computer readable medium, for example the magnetic disks or the semiconductor memories; and
(iii) Computer temporally storing the computer program in the memory through the data transferring means.

While the invention has been described with reference to preferred exemplary embodiments thereof, it is to be understood that the invention is not limited to the disclosed embodiments or constructions. On the contrary, the invention is intended to cover various modifications and equivalent arrangements. In addition, while the various elements of the disclosed invention are shown in various combinations and configurations, which are exemplary, other combinations and configurations, including more less or only a single element, are also within the spirit and scope of the invention.

C5. Other Examples

The present invention can be realized as the following aspects or application examples in order to address at least part of the problems described above.

Aspect 1.

A control device for controlling access to an external storage device comprising:

a fetching unit that fetches, from the external storage device, attribute information relating to data stored in the external storage device, a virtual drive creation unit that creates, in the control device, a virtual drive for storing the fetched attribute information, and an access control unit that controls access to the virtual drive and the external storage device, wherein when an instruction relating to the attribute information is input, the access control unit accesses the virtual drive to fetch the attribute information;

when an instruction to read the data from the external storage device is input, the access control unit accesses the external storage device to reads the data; and when an instruction to write new data to the external storage device is input, the access control unit accesses the external storage device to write the new data.

As the aforementioned virtual drive, it is possible to use a RAM disk, for example. Also, as the aforementioned attribute information, examples include folder information (e.g. name, size, creation date and time), file information (e.g. name, size, thumbnail, creation date, upgrade date and time), for example.

With the control device of aspect 1, the aforementioned attribute information is stored in the virtual drive. Accordingly, it is possible for the user, using the control device, to get the attribute information relating to data stored in the external storage device, even after, for example, communication between the control device (e.g. a personal computer) and the external storage device is stopped, or the external storage device is not operating, in order to save power with the external storage device. Furthermore, with the control device of aspect 1, regardless of the operating status of the external storage device, and without being aware of the operating state of the external storage device, the user is able to get the attribute information stored in the virtual drive and read it. Therefore, it is possible to improve the usability when, for example, power with the external storage device is saved.

Aspect 2.

A control device according to aspect 1, further comprising:

a stop signal output unit that, at a specified timing after the virtual drive is created, outputs to the external storage device a stop signal for stopping operations of the external storage device.

The external storage device that has received the stop signal output from the control device of aspect 2 stops operation according to this stop signal. With this aspect, it is possible to save power with the external storage device. Note that the "specified timing" can be set as desired as long as it is after the virtual drive is created and the attribute information is stored on the virtual drive. For example, the control device of this aspect can also be made to output a stop signal immediately after the attribute information is stored on the virtual drive.

Aspect 3.

A control device according to aspect 2, further comprising:

a timing setting unit that sets the specified timing according to a setting instruction by a user.

With this aspect, the control device outputs the stop signal at the timing set by the user, so it is possible to improve convenience.

Aspect 4.

A control device according to aspect 2 or 3, further comprising:

an activation signal output unit that, after the stop signal is output, outputs to the external storage device an activation signal to activate the external storage device, when an instruction to read the data from the external storage device or an instruction to write new data to the external storage device is input.

The external storage device that has received the activation signal output from the control device of aspect 4 is automatically reactivated according to this activation signal. With this aspect, it is possible to reactivate the external storage device, for which operation has stopped, without the user being conscious of it, so it is possible to improve the usability when reactivating the external storage device.

Aspect 5.

A control device according to any of aspects 1 to 4 wherein the virtual drive creation unit updates the attribute information in the virtual drive, when data corresponding to the attribute information is fetched from the external storage device or the new data is written to the external storage device.

With this aspect, it is possible to maintain the precision and up-to-date status of the aforementioned attribute information stored in the virtual drive.

Aspect 6.

A control device according to any of aspects 1 to 6 wherein the virtual drive creation unit creates the virtual drive and stores the fetched attribute information in the virtual drive, when the control device is activated.

With this aspect, for example, it is possible for the user to get the aforementioned attribute information even when the operation of the external storage device is stopped immediately after the aforementioned attribute information is stored in the virtual drive.

Aspect 7.

A control device according to any of aspects 1 to 7 wherein the external storage device is a hard disk drive connected to the control device.

Note that as the external storage drive, for example, it is possible to use a so called external hard disk drive or internal hard disk drive, as well as an external MO drive, CD drive, DVD drive.

Aspect 8.

A control device according to any of aspects 1 to 7, further comprising:

a power supply unit that supplies power to the external storage device.

With this aspect, it is possible to have the external storage device operate by the power supplied from the control device (bus power), for example.

Aspect 9.

An external storage device connected to a control device, comprising:

a data storage unit that stores data;

an attribute information storage unit that stores attribute information relating to the data, independently from the data in the data storage unit; and an output unit that outputs the attribute information in the attribute information storage unit or the data in the data storage unit according to an output request from the control device.

The external storage device of aspect 9 is able to output the attribute information from the attribute information storage unit without accessing the data storage unit, for example, without driving the drive unit (motor or head) for outputting data from the data storage unit, according to an output request from the control device. As this attribute information, examples include folder information (e.g. name, size, contents, creation date and time) or file information (e.g. name, size, thumbnail, creation date and time, update date and time). Also, the external storage device of this aspect is able to output data corresponding to the aforementioned attribute information from the data storage unit according to an output request from the control device. Note that generally, the data size of the attribute information is smaller than the data size of the data, so it is sufficient that the attribute information storage unit has storage capacity smaller than that of the data storage unit, and for example, it is preferable to apply relatively compact and light flash memory.

Aspect 10.

A control device for controlling access to an external storage device that comprises: a data storage unit for storing data; an attribute information storage unit for storing attribute information relating to the data independently from the data in the data storage unit; and an output unit for outputting the attribute information in the attribute information storage unit or the data in the data storage unit according to an output request from the control device, wherein when an instruction relating to the attribute information is input, the control device accesses the attribute information storage unit to fetch the attribute information, when an instruction to read the data from the external storage device is input, the control device accesses the data storage unit to read the data; and when an instruction to write new data to the external storage device is input, the control device accesses the data storage unit to write the new data.

With the control device of aspect 10, it is possible for the user to get attribute information from the attribute information storage unit without accessing the data storage unit, for example, without driving the drive unit (motor or head) for outputting data from the data storage unit. Furthermore, with the control device of this aspect, regardless of the operation status of the data storage unit, and without being conscious of the operating state of the data storage unit, it is possible for the user to get the attribute information stored in the attribute information storage unit. Therefore, it is possible to improve the usability when, for example, saving power with the external storage device.

The invention can be constituted with parts of the various features described above suitably combined. Also, the invention can also have a constitution as an invention of a control method of a control device and a control method of an external storage device in addition to the constitution as the control device and external storage device described above. It is also possible to realize various aspects such as a recording medium on which this program is recorded. Note that with the respective modes, it is possible to apply the various additional elements shown previously.

When constituting the invention as a recording medium on which that program is recorded, it is possible to constitute the program as an overall program that controls the operation of the control device and the external storage device, and also to constitute it as only the part that performs the functions of the invention. Also, as the recording medium, it is possible to use various media that can be read by a computer such as a floppy disk, CD-ROM, DVD-ROM, magnetic optical disk, IC card, ROM cartridge, punch card, printed matter on which a code is printed such as a bar code, a computer internal storage device (memory such as RAM, ROM or the like), and external storage devices and the like.

What is claimed is:

1. A control device for controlling access to an external storage device comprising:
    a fetching unit that fetches, from the external storage device, attribute information relating to data stored in the external storage device,
    a virtual drive creation unit that creates, in the control device, a virtual drive for storing the fetched attribute information, and
    an access control unit that controls access to the virtual drive and the external storage device, wherein:
    when an instruction relating to the attribute information is input, the access control unit accesses the virtual drive to fetch the attribute information;
    when an instruction to read the data from the external storage device is input, if the external storage device is at a stop, the access control unit activates the external storage device to reads the data; and
    when an instruction to write new data to the external storage device is input, if the external storage device is at a stop, the access control unit activates the external storage device to write the new data;
    wherein the external storage device stops operation at a predetermined time after operation of the external storage device is not required and reactivated to perform a read or a write.

2. The control device according to claim 1, further comprising:
    a stop signal output unit that, at a specified timing after the virtual drive is created, outputs to the external storage device a stop signal for stopping operations of the external storage device.

3. The control device according to claim 2, further comprising:
    a timing setting unit that sets the specified timing according to a setting instruction by a user.

4. The control device according to claim 2, further comprising:
    an activation signal output unit that, after the stop signal is output, outputs to the external storage device an activation signal to activate the external storage device, when an instruction to read the data from the external storage device or an instruction to write new data to the external storage device is input.

5. The control device according to claim 1 wherein
    the virtual drive creation unit updates the attribute information in the virtual drive, when data corresponding to the attribute information is fetched from the external storage device or the new data is written to the external storage device.

6. The control device according to claim 1 wherein
    the virtual drive creation unit creates the virtual drive and stores the fetched attribute information in the virtual drive, when the control device is activated.

7. The control device according to claim 1 wherein
    the external storage device is a hard disk drive connected to the control device.

8. The control device according to claim 1, further comprising:
a power supply unit that supplies power to the external storage device.

9. An external storage device connected to a control device, comprising:
a data storage unit that stores data;
an attribute information storage unit that stores attribute information relating to the data, independently from the data in the data storage unit; and
an output unit that outputs the attribute information in the attribute information storage unit or the data in the data storage unit according to an output request from the control device;
wherein the external storage device is configured to stop operation of the data storage unit after a predetermined time period in a state in which its operation is not required and to reactivate the data storage unit in response to the output request from the control device to read data.

10. A control device for controlling access to an external storage device that comprises:
a data storage unit for storing data;
an attribute information storage unit for storing attribute information relating to the data independently from the data in the data storage unit;
and an output unit for outputting the attribute information in the attribute information storage unit or the data in the data storage unit according to an output request from the control device,
wherein
when an instruction relating to the attribute information is input, if the storage device is at a stop, the control device activates the attribute information storage unit to fetch the attribute information,
when an instruction to read the data from the external storage device is input, if the external storage device is at a stop, the control device activates the data storage unit to read the data; and
when an instruction to write new data to the external storage device is input, if the storage device is at a stop, the control device activates the data storage unit to write the new data;
wherein the external storage device is configured to stop operation of the data storage unit after a predetermined time period in a state in which its operation is not required.

11. A control method for controlling access to an external storage device, comprising:
fetching, from the external storage device, attribute information relating to data stored in the external storage device;
creating, in a control device, a virtual drive for storing the fetched attribute information; and
controlling access to the virtual drive and the external storage device, wherein
the access control includes:
accessing the virtual drive to fetch the attribute information, when an instruction relating to the attribute information is input;
activating the external storage device to read the data, when an instruction to read the data from the external storage device is input, if the external storage device is at a stop; and
activating the external storage device to write new data, when an instruction to write the new data to the external storage device is input, if the external storage device is at a stop;
wherein the external storage device stops operation at a predetermined time after operation of the external storage device is not required and reactivated to perform a read or a write.

12. A control method of an external storage device connected to a control device, comprising:
storing data in a data storage unit in the external storage device,
storing, in an attribute information storage unit in the external storage device, attribute information relating to the data, independently from the data in the data storage unit, and
outputting the attribute information in the attribute information storage unit or the data in the data storage unit according to an output request from the control device;
wherein the external storage device is configured to stop operation of the data storage unit after a predetermined time period in a state in which its operation is not required and to reactivate the data storage unit in response to the output request from the control device to read data.

13. A control method for controlling access to an external storage device that comprises: a data storage unit for storing data; an attribute information storage unit for storing attribute information relating to the data independently from the data in the data storage unit; and an output unit for outputting the attribute information in the attribute information storage unit or the data in the data storage unit according to an output request from a control device, the control method comprising:
accessing the attribute information storage unit to fetch the attribute information, when an instruction relating to the attribute information is input;
activating the data storage unit to read the data, if the external storage device is at a stop when an instruction to read the data from the external storage device is input; and
activating the data storage unit to write new data, if the external storage device is at a stop when an instruction to write the new data to the external storage device is input;
wherein the external storage device is configured to stop operation of the data storage unit after a predetermined time period in a state in which its operation is not required.

14. A computer program product for controlling access to an external storage device, the computer program product comprising:
a computer readable medium; and
a computer program stored on the computer readable medium, the computer program comprising:
a portion for fetching, from the external storage device, attribute information relating to data stored in the external storage device;
a portion for creating, in a control device, a virtual drive for storing the fetched attribute information; and
a portion for controlling access to the virtual drive and the external storage device, wherein
the portion for controlling access includes:
a portion for accessing the virtual drive to fetch the attribute information, when an instruction relating to the attribute information is input;
a portion for activating the external storage device to reads the data, if the external storage device is at a stop when an instruction to read the data from the external storage device is input; and a portion for activating the external storage device to write new data, if the external storage device is at a stop when an instruction to write the new data to the external storage device is input;

wherein the external storage device stops operation at a predetermined time after operation of the external storage device is not required and reactivated to perform a read or a write.

15. A computer program product for controlling an external storage device connected to a control device, the computer program product comprising:

a computer readable medium; and a computer program stored on the computer readable medium, the computer program comprising:

a portion for storing data in a data storage unit in the external storage device, a portion for storing, in an attribute information storage unit in the external storage device, attribute information relating to the data, independently from the data in the data storage unit, and a portion for outputting the attribute information in the attribute information storage unit or the data in the data storage unit according to an output request from the control device;

wherein the external storage device is configured to stop operation of the data storage unit after a predetermined time period in a state in which its operation is not required and to reactivate the data storage unit in response to the output request from the control device to read data.

16. A computer program product for controlling access to an external storage device that comprises: a data storage unit for storing data; an attribute information storage unit for storing attribute information relating to the data independently from the data in the data storage unit; and an output unit for outputting the attribute information in the attribute information storage unit or the data in the data storage unit according to an output request from a control device, the computer program product comprising:

a computer readable medium; and a computer program stored on the computer readable medium, the computer program comprising:

a portion for accessing the attribute information storage unit to fetch the attribute information, when an instruction relating to the attribute information is input;

a portion for activating the data storage unit to read the data, if the external storage device is at a stop when an instruction to read the data from the external storage device is input; and a portion for activating the data storage unit to write new data, if the external storage device is at a stop when an instruction to write the new data to the external storage device is input;

a portion for the stopping of the data storage unit after a predetermined time period in a state in which its operation is not required.

* * * * *